(12) United States Patent
Gilbert et al.

(10) Patent No.: US 8,014,305 B1
(45) Date of Patent: Sep. 6, 2011

(54) WIRELESS LAN USING TRANSMISSION MONITORING

(75) Inventors: Jeffrey M. Gilbert, Sunnyvale, CA (US); James Woo, Los Altos, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 3301 days.

(21) Appl. No.: 10/139,935

(22) Filed: May 6, 2002

Related U.S. Application Data

(60) Provisional application No. 60/317,882, filed on Sep. 7, 2001.

(51) Int. Cl.
*H04L 12/26* (2006.01)
(52) U.S. Cl. ........................................ 370/252
(58) Field of Classification Search ........................ None
See application file for complete search history.

(56) References Cited

U.S. PATENT DOCUMENTS

| | | | |
|---|---|---|---|
| 5,638,408 A * | 6/1997 | Takaki | 375/341 |
| 6,400,731 B1 * | 6/2002 | Nitta | 370/468 |
| 6,535,523 B1 * | 3/2003 | Karmi et al. | 370/468 |
| 6,549,759 B2 * | 4/2003 | Arviv et al. | 455/69 |
| 6,728,217 B1 * | 4/2004 | Amirijoo et al. | 370/252 |
| 6,757,255 B1 * | 6/2004 | Aoki et al. | 370/252 |
| 6,760,313 B1 * | 7/2004 | Sindhushayana et al. | 370/252 |
| 6,912,204 B2 | 6/2005 | Kossi et al. | |
| 6,947,387 B1 * | 9/2005 | Saw | 370/252 |
| 6,985,437 B1 | 1/2006 | Vogel | |
| 6,985,453 B2 * | 1/2006 | Lundby et al. | 370/311 |
| 7,127,654 B2 | 10/2006 | Jalali et al. | |
| 2002/0062472 A1 * | 5/2002 | Medlock et al. | 716/1 |
| 2002/0133584 A1 * | 9/2002 | Greuel et al. | 709/224 |
| 2002/0197999 A1 * | 12/2002 | Wu et al. | 455/452 |
| 2003/0021243 A1 * | 1/2003 | Hamalainen | 370/329 |
| 2003/0133422 A1 | 7/2003 | Bims | |
| 2005/0118958 A1 | 6/2005 | Alexiou | |
| 2006/0067278 A1 * | 3/2006 | Li et al. | 370/335 |
| 2006/0094367 A1 | 5/2006 | Miyoshi et al. | |

* cited by examiner

*Primary Examiner* — Chi H Pham
*Assistant Examiner* — Mohammad S Adhami
(74) *Attorney, Agent, or Firm* — Bever, Hoffman & Harms, LLP; Jeanette S. Harms

(57) ABSTRACT

Transmission monitoring can be used to determine the optimum data rate for a channel. The transmission monitoring can include sending data packets in the channel using various data rates. At least some data packets are sent using the current optimum data rate, a rate lower than the current optimum data rate, and a rate higher than the current optimum data rate. One of these data rates can be selected as the new optimum data rate. In one embodiment, if the current optimum data rate is less than a predetermined data rate, then the client is triggered to begin scanning for other available access points.

14 Claims, 10 Drawing Sheets

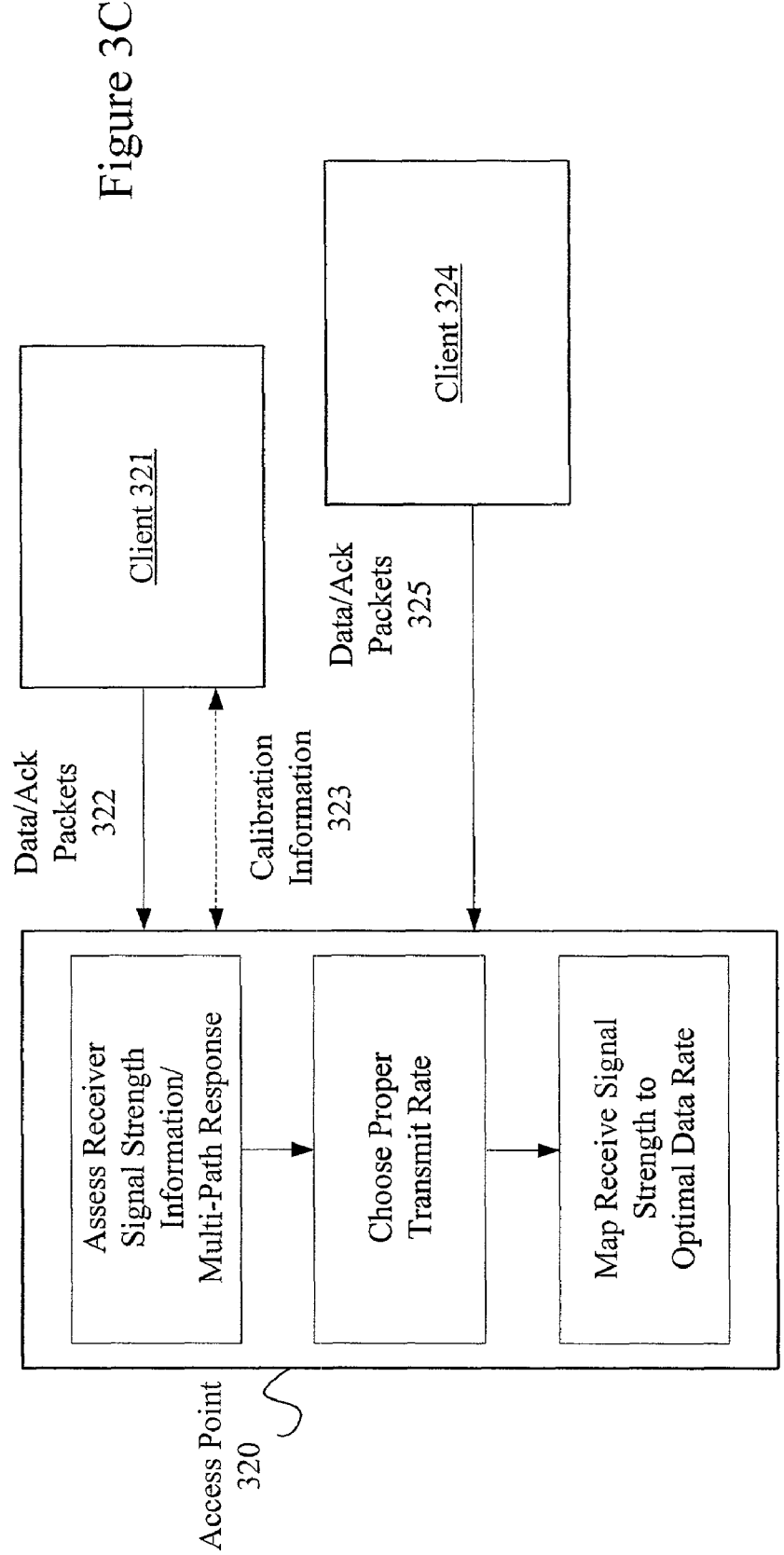

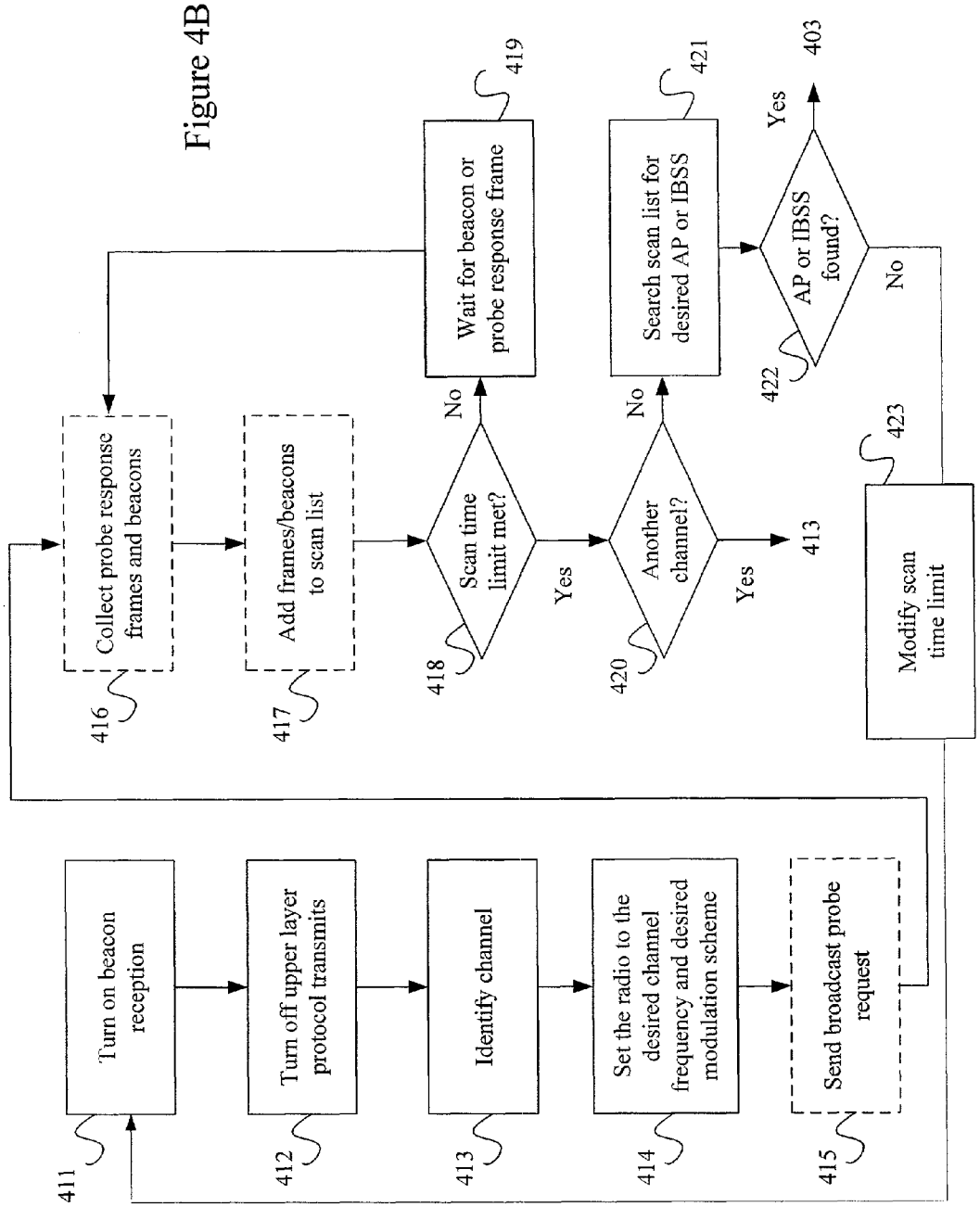

WIRELESS LAN USING TRANSMISSION MONITORING

RELATED APPLICATION

This application claims the benefit of U.S. Provisional Application No. 60/317,882, filed on Sep. 7, 2001.

BACKGROUND OF THE INVENTION

1. Field of the Invention

The invention relates to the field of networks and particularly to a wireless local area network.

2. Description of the Related Art

Many devices currently have the capability to communicate without the use of a wired network. Such devices can include, for example, laptops and personal digital assistants (PDAs). These devices can use a wireless local area network (LAN), which can operate separately from or operate in conjunction with an existing wired network.

Wireless communication can be characterized by two modes of operation: an infrastructure mode and an ad hoc mode. FIG. 1A illustrates an infrastructure mode, wherein an access point AP1 communicates with a plurality of clients C1, C2, and C3. Note that in order for client C1 to communicate with client C3, client C1 must communicate via access point AP1. Thus, access point AP1 functions as a communication hub between clients C1, C2, and C3.

Access point AP1 also serves as a gateway for clients C1, C2, and C3 to communicate with clients not associated with access point AP1. For example, access point AP1 can communicate with another access point, such as access point AP2, which in turn can be associated with a plurality of clients C4 and C5. Because a client can be a mobile device and each access point has a predetermined range of service, a client may associate with an access point for a first time period and then associate with another access point for a second time period. For example, client C3, which is communicating with client C2, could at some time be outside the range of access point AP1. At this point, client C3 could disassociate from access point AP1 and associate with access point AP2, as indicated by dashed lines, thereby ensuring that its communication to client C2 is maintained.

In contrast, FIG. 1B illustrates an ad hoc (also called a peer-to-peer or independent BSS) mode, wherein clients C1, C2, and C3 can communicate directly without an access point. In this mode, each client would have access to the resources of the other clients, but not to the resources of an access point, which typically includes a central server. Therefore, communication in the infrastructure mode can generally support more complex and volume intensive use.

Although wireless communication typically involves only one sender, various communication modes can involve different numbers of receivers. For example, a unicast transmission is a transmission from one sender to one specified receiver. In contrast, a broadcast transmission is a transmission from one sender to all receivers in a given area, whereas a multicast transmission from one sender to a specified group of multiple receivers. Note that a sender (or a receiver) could be an access point or a client in accordance with standard characterizations. The term "station", as used herein, can generically refer to either a sender or a receiver.

In wireless communication, messages can be transmitted as packets of data over a channel, wherein a packet has a header (e.g. including the sender's and receiver's addresses) as well as data. Note that the channel can be defined by one or more characteristics (e.g. a frequency and/or a modulation scheme). In packet switching, the sender transmits each packet individually over the channel to its destination.

For example, FIG. 1C illustrates a sender 110 transmitting multiple streams of communication 111, 112, and 113 over a channel 130 to a receiver 120. In one embodiment, these multiple streams of communication 111, 112, and 113 could provide different applications, e.g. video, data, and audio, thereby requiring separate queuing for each stream to ensure quality of service (QoS). For example, a communication 100 could comprise a plurality of serially-transmitted packets 101-107, wherein communication stream 111 includes video packets 101-103 in sequence, communication stream 112 includes data packets 104-106 in sequence, and communication stream 113 includes an audio packet 107.

Many wireless communication schemes, such as those based on the IEEE 802.11 standards (including the IEEE 802.11a and 802.11b standards), can be implemented using a range of data rates. For example, the IEEE 802.11b standard enables data rates from 1 Mbps to 11 Mbps, whereas the IEEE 802.11a standard enables data rates from 6 Mbps to 54 Mbps. Due to various features of the encoding schemes dictated by many such wireless communication standards, transmission on a channel is generally established at a selected available data rate within an available spectrum of rates.

For example, depending on channel conditions, reliable communication in compliance with the IEEE 802.11a standard may take place at 6 Mbps, 9 Mbps, 12 Mbps, 18 Mbps, 24 Mbps, 36 Mbps, 48 Mbps or up to the highest supported rate. (Proprietary extensions to the 802.11a standard allow transmissions to take place at other rates, including 12 Mbps, 18 Mbps, 24 Mbps, 36 Mbps, 48 Mbps, 72 Mbps, 96 Mbps, or 108 Mbps.) Lower data rates typically allow for more reliable transmissions in challenging environments, e.g. noisy, distant, or otherwise flawed channels. Higher data rates can be used across ideal or nearly ideal channels. As used herein, any two of these available rates in numerical order are considered "adjacent" rates. Note that other intermediate, slower, or faster data rates may be possible either currently or in the future. Thus, the embodiments herein using specific data rates are illustrative only and not limiting.

As used herein, the term data rate refers to the transmission rate of the transmitting device used by sender 110. Clearly, once in channel 130, the speed of transmission for all packets 101-107 would be constant at the speed of light. The data rate becomes important because of signal degradation in channel 130. As more signal degradation occurs, the receiving device of receiver 120 needs more time to accurately read the data. Because the transmitting device and the receiving device are set to the same data rate, the lower the data rate of the transmitting device the more time the receiving device has to read the data. However, for maximum throughput, it is desirable to determine the highest, reliable data rate available.

Unfortunately, dynamic conditions present in the channel can degrade signal quality. For example, one reason for signal degradation is shadow fading, wherein objects near either the transmitter or the receiver (e.g. walls, people, cars) can block the signal. Another reason for signal degradation is distance-dependent path loss, wherein the signal experiences a reduction of power with increasing distance. Yet another reason for signal degradation is multi-path propagation, wherein echoes of a single signal (e.g. caused by reflection) can result in the superposition of that signal. A final reason for signal degradation is interference, wherein other signals in the vicinity of a first signal can interfere with that first signal, thereby degrading its quality. Note that these other signals could be from either 802.11 compliant devices that are too far away to know to be quiet, but close enough to affect a given signal when they talk, or from non-compliant devices (e.g. devices using different standards).

Current schemes fail to accurately account for these dynamic changes in the channel. For example, in one scheme, a system administrator can determine (or at least estimate) the distance between stations and set the data rate according to this distance. In other words, if the stations are close together, then the data rate can be set relatively high as the likelihood of signal degradation is low. In contrast, if the stations are far apart, then the data rate can be set relatively low as the likelihood of signal degradation is high. Of importance, this scheme fails to take into account actual channel conditions, which can vary significantly irrespective of distance between stations.

In another scheme, if the packet error rate (i.e. the number of packets that fail to reach the receiver divided by the total number of packets sent by the sender) exceeds a predetermined threshold, then the data rate for subsequent packets could be adjusted to the next lower data rate. In contrast, if the packet error rate falls below another predetermined threshold, then the data rate for subsequent packets could be adjusted to the next higher data rate. These predetermined thresholds provide a sub-optimal solution that worsens with the number of available data rates. In other words, for a limited number of data rates, the fixed thresholds based on packet error rate provide a rough, but relatively reasonable indication of when to change to another data rate. However, in systems where numerous data rates are available, the fixed thresholds based on packet error rate can become too rough for meaningful adjustment of the data rate.

Therefore, a need arises for a system and method of automatically optimizing utilization of the wireless channel.

SUMMARY OF THE INVENTION

In accordance with one aspect of the invention, transmission monitoring can be used to determine the optimum data rate for a channel. The transmission monitoring can include sending a first subset of a plurality of data packets in the channel using a first data rate, wherein the first data rate is a current optimum data rate. A second subset of the plurality of data packets can be sent in the channel using a second data rate, wherein the second data rate is lower than the first data rate. Finally, a third subset of the plurality of data packets can be sent in the channel using a third data rate, wherein the third data rate is higher than the first data rate. One of the first data rate, the second data rate, and the third data rate can be selected as a new optimum data rate. In one embodiment, the second data rate and the third data rate are adjacent data rates to the first data rate.

In one embodiment, analyzing packet error rates for the first, second, and third subsets can be used to select the new optimum data rate. A threshold can be applied to the packet error rate of the second subset and/or the third subset to factor in the risk of changing a data rate. For example, because a higher data rate generally has a higher risk of transmission degradation, the packet error rate of the higher rate could be at most a predetermined percentage higher than the packet error rate of the current optimum rate before the data rate is increased to the higher rate.

The threshold can also be adjusted based on quality of service for the transmission, thereby balancing robustness with speed. Specifically, a higher quality of service can increase a threshold for increasing a data rate (thereby decreasing a tolerable increase in packet error rate) and decrease a threshold for decreasing a data rate (thereby decreasing the required decrease in packet error rate). For example, instead of raising a data rate based on an N % increase in packet error rate, the data rate for a communication stream having a high quality of service could be raised only if a ½ N % increase in packet error rate could be achieved at the higher data rate.

In another embodiment, analyzing net throughputs for the first, second, and third subsets can be used to select the new optimum data rate. A threshold can be applied to the throughput of the second subset and/or the third subset to factor in the risk of changing a data rate and uncertainty in throughput estimation. For example, the throughput of the higher rate could be a predetermined percentage higher than the throughput of the current optimum rate before the data rate is increased to the higher rate. The threshold can also be adjusted based on quality of service requirements for the transmission, thereby balancing robustness with speed. Specifically, a higher quality of service can increase a threshold for increasing a data rate and decrease a threshold for decreasing a data rate. For example, instead of raising a data rate based on an N % increase in throughput, the data rate for a communication stream having a high quality of service could be raised only if a 2N % increase in throughput could be achieved.

To determine the packet error rate and/or the throughput, a plurality of feedback signals from the receiver of the transmission can be analyzed. Specifically, after receiving a data packet, the receiver sends a feedback signal to the sender, thereby indicating a successful transmission of that packet. In one embodiment, the feedback signals include acknowledge signals. In another embodiment, the feedback signals include data packets whose purpose is to determine packet error rates. Ping (i.e. debug) packets are one such type of packet. In either embodiment, the receiver does not require any knowledge of the transmission monitoring being performed because it already provides such feedback signals in compliance with standard protocols. Therefore, transmission monitoring using these feedback signals eliminates the need for observing actual signal statistics, e.g. signal strength, at the receiver. Thus, transmission monitoring can be effectively applied to many existing systems without any changes to the receiver or networking protocols.

In another embodiment of the invention, instead of having packets sent at both the lower and higher data rates, packets can be sent at the current optimum data rate (the first data rate) and the higher data rate (the second data rate). In this embodiment, selecting the first data rate includes determining whether the first data rate is stale. If the first data rate is stale, then the current optimum data rate can be changed to a third data rate, wherein the third data rate is lower than the first data rate. On the other hand, if the first data rate is not stale, then the first data rate can be maintained as the current optimum data rate. Determining whether the first data rate is stale can include measuring either the time of transmission at the first data rate or the number of packets sent using the first data rate.

In accordance with another aspect of the invention a wireless local area network (LAN) supporting multiple transmission rates is provided. The wireless LAN can include a sender capable of transmitting a plurality of packets over a channel, a first subset of the plurality of packets being at a first data rate (i.e. a current data rate), a second subset of the plurality of packets being at a second data rate (the second data rate being lower than the first data rate), and a third subset of the plurality of packets being at a third data rate (the third data rate being higher than the first data rate). The wireless LAN can further include a receiver capable of receiving the plurality of packets on the channel and providing a feedback signal to the sender over the channel for each packet received. The sender can further include means for selecting the first data rate, the second data rate, or the third data rate as an optimum data rate.

The means for selecting can include a rate control table for tracking packets sent and feedback signals received. In one embodiment, the rate control table stores information from the exact throughput obtained by each packet transmitted. In the same or different embodiment, the rate control table can distinguish between one or more different sizes of packets and store aggregate throughput information. The means for selecting can further include a look-up table (LUT) for determining a throughput for each of the first subset, the second subset, and the third subset. Note that the sender or receiver can be an access point In accordance with another aspect of the invention, a method of controlling the data rate for packets in a channel is provided. The method can include designating predetermined sizes for the packets, providing a first data rate for a first predetermined size of packet, and providing a second data rate for a second predetermined size of packet.

In accordance with another aspect of the invention, a method of controlling the data rate for packets by using channel conditions directly measured by the transmitter is described. When the transmitter receives data or acknowledgement packets, the transmitter can assess multi-path channel information and receive signal strength information from the incoming packet. The transmitter can use this information to estimate the degradation that packets it sends will experience. In this manner, the transmitter can accurately choose an appropriate transmit rate. This method can be further improved by an optional calibration step whereby the transmitter and receiver determine the differences between them in transmit output power and/or receive sensitivity.

In accordance with another aspect of the invention, a method of controlling the data rate for packets by using channel conditions directly measured by the receiver is described. In this method, the receiver assesses the quality of the input signal by looking at the multi-path channel information and a receive signal strength indicator. The receiver then determines the optimal rate for packet transmissions and communicates this rate to the transmitter using an out-of-band transmission, e.g. a packet specifically for relaying this feedback, or a regular packet. The feedback can either be a rate recommendation, set of rate recommendations for different lengths, or received signal strength and multi-path information.

In accordance with another aspect of the invention, a method of determining the optimal rate for transmission to one of an access point's client can be determined in part from the optimal rate of transmission to another client. Using the previously described methods, the access point can determine an optimal rate to communicate with a given client. The access point can then use this information as a mapping of the receive signal strength to the optimal data rate. This mapping can then be used to infer what the optimal data rate for other clients with similar receive signal strengths should be.

In accordance with another aspect of the invention, a method of identifying available access points for a client in a wireless communication system is provided. The method can include using a power save mode to momentarily suspend transmission between a current access point and the client, collecting information regarding another access point, and then returning to the current access point before communication between the client and the current access point is disrupted.

To use the power save mode to momentarily suspend transmission between a current access point and the client, the power save poll generation can be disabled in the client. A null data frame can then be sent to the access point with a power save bit turned on to instruct the access point not to send the client any data frames. Finally, the client can wait for confirmation that the access point will buffer any frames destined for the client.

To collect information regarding another access point, the client can set a desired channel frequency and modulation scheme, send a broadcast probe request, receive probe response frames and beacons from another access point, and then add the received response frames and beacons to a scan list. Returning to the current access point can include enabling the power save poll generation in the client, sending another null data frame to the access point with the power save bit turned off, and draining buffered packets from the access point. If another channel is available after normal operation for a predetermined period of time, then the method can return to disabling power save poll generation in the client. This scanning method can also be performed without using the power-save mechanism, although the risk of some traffic loss for the client can increase.

A method of responding to a current data rate between a client and an access point in a wireless local area network is also provided. In one embodiment, the method can include determining if the current data rate is less than a predetermined data rate. If the current data rate is not less than the predetermined data rate, then transmission can be continued for a predetermined period of time. However, if the current data rate is less than the predetermined data rate, then the client can begin roaming for another access point. The roaming can include using a power save feature of the client for background scanning.

BRIEF DESCRIPTION OF THE FIGURES

FIGS. 3A-3C illustrate exemplary alternative transmission monitoring techniques.

FIG. 4B illustrates a flow chart of a pre-connection scanning technique for a client to find an access point.

DETAILED DESCRIPTION OF THE FIGURES

Transmission Monitoring Technique

In an ideal system, every transmission of a packet in a channel would be sent at an optimum rate. However, due to the dynamic nature of channel conditions, this optimum rate becomes a moving target. In accordance with one aspect of the invention, the data rate of any communication, communication stream, and/or packet can be adapted based on channel conditions inferred from transmission monitoring. Specifically, in one embodiment of the invention, at least one packet can be sent in the channel at a different selected rate, which can be a rate higher or lower than the current optimum rate. In another embodiment, at least two packets can be sent in the channel at the rates higher and lower than the predetermined optimum rate. Note that the higher/lower rate can be the adjacent rate or another rate having a defined relationship to the current rate.

Figure 2A:
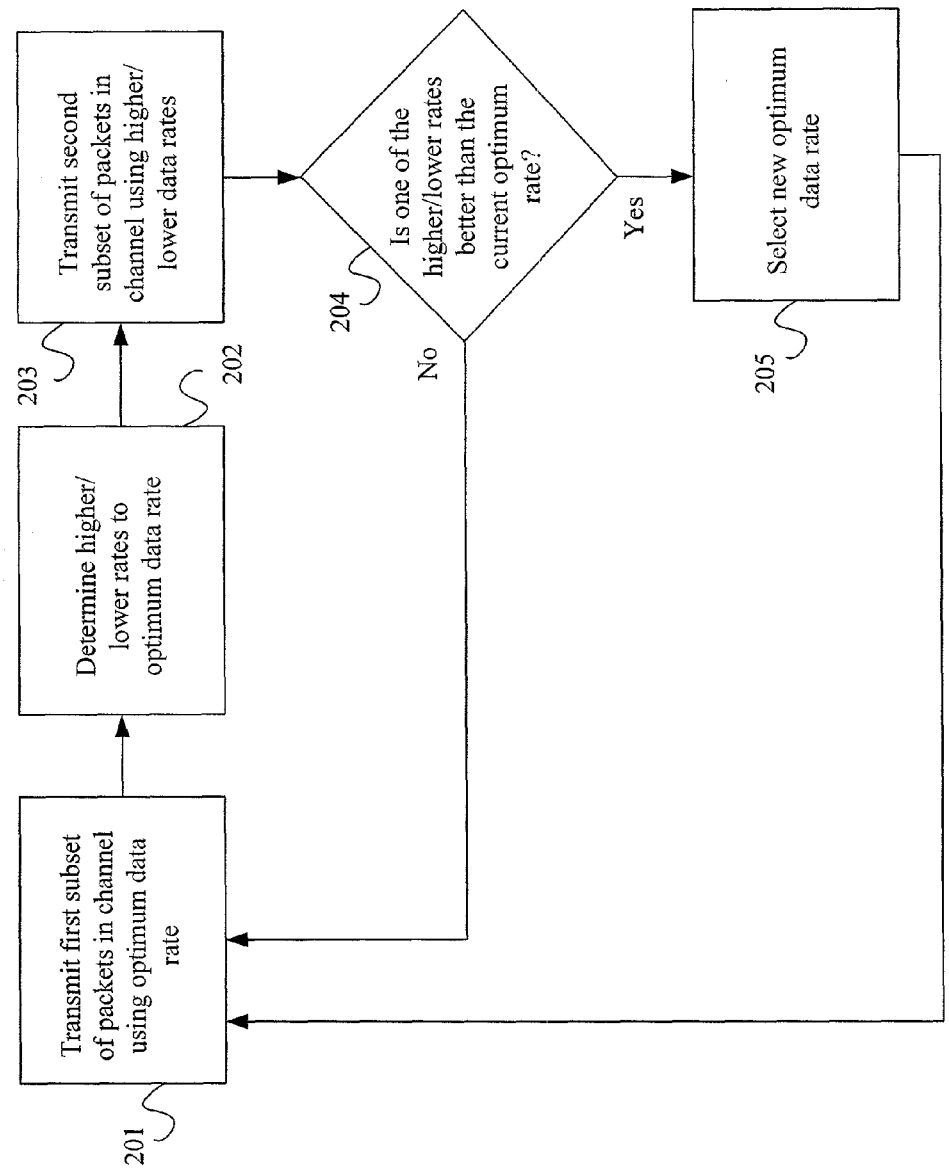
FIG. 2A illustrates a flow chart of one transmission monitoring technique.

FIG. 2A illustrates a flow chart of one transmission monitoring technique. In step 201 of this transmission monitoring technique, a first subset of the packets being sent in a channel can be sent using a selected optimum data rate. In step 202, higher and lower data rates to the optimum data rate can be determined. In one embodiment, adjacent data rates can be used. For example, if the originally selected data rate is 36 Mbps, then the adjacent data rates of 24 Mbps and 48 Mbps can be selected. Then, a second subset of the packets can be sent using the higher and lower data rates in step 203. If one of the other data rates is better than the current optimum rate, as determined in step 204, then that data rate can be selected as the new optimum data rate in step 205. In one embodiment, the best data rate is the highest data rate for providing reliable transmission of packets on that channel. If one of the other data rates is not better than the current optimum rate, then the process returns to step 201 wherein a first subset of the packets in the channel are sent at the current optimum rate.

Note that the actual number of packets associated with the first and second subsets can be adjusted based on the data rate. For example, in a "medium" data rate case, for every 10 packets sent at the optimum data rate (step 201), one packet could be sent at a higher data rate and another packet could be sent at a lower data rate (step 203). In a "high" data rate case, perhaps the number of packets sent at the optimum data rate (step 201) could be increased to 20 and the total number of packets sent at the higher/lower data rates (step 203) could remain at two. In another "high" data rate case, perhaps the number of packets sent at the optimum data rate (step 201) could be increased to 30 and the total number of packets sent at the higher/lower data rates (step 203) could be increased to four. Note that the terms "medium" and "high" are relative to the spectrum of available data rates.

Further note that the actual number of packets associated with the first and second subsets can be adjusted based on quality of service. For example, assuming a high quality of service (e.g. voice traffic), the number of packets in the second subset sent at the other data rates could be significantly limited. In one case, perhaps the number of packets in the first subset sent at the optimum data rate (step 201) could be 50 and the total number of packets in the second subset sent at the higher/lower data rates (step 203) could be limited to two. However, if a lower quality of service is needed, then the number of packets in the second subset sent at the other data rates could be increased.

Figure 1A:
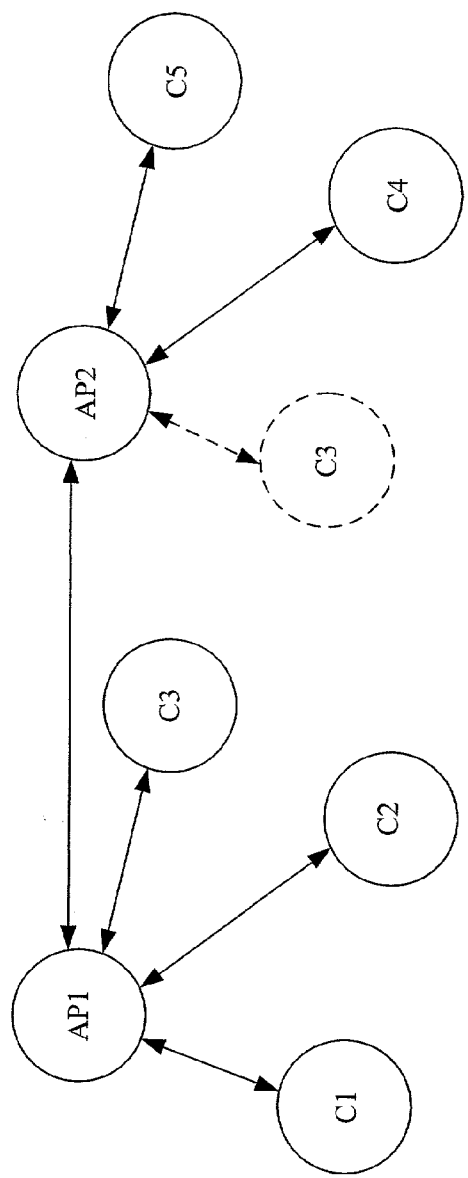
FIG. 1A illustrates an infrastructure mode, wherein an access point can communicate with a plurality of clients.

Note that for a sender communicating simultaneously with several receivers, i.e. a broadcast or multicast transmission, the optimum data rate can be analyzed independently for each receiver. In this case, the most robust, i.e. slowest, rate of the various channels can be used for all channels. Thus, for example, assuming that access point AP1 is communicating simultaneously with clients C1, C2, and C3 (see FIG. 1A) and the optimum data rates to clients C1, C2, and C3 are 12 Mbps, 18 Mbps, and 24 Mbps, respectively, then access point AP1 would use a data rate of 12 Mbps for all channels.

Figure 2B:
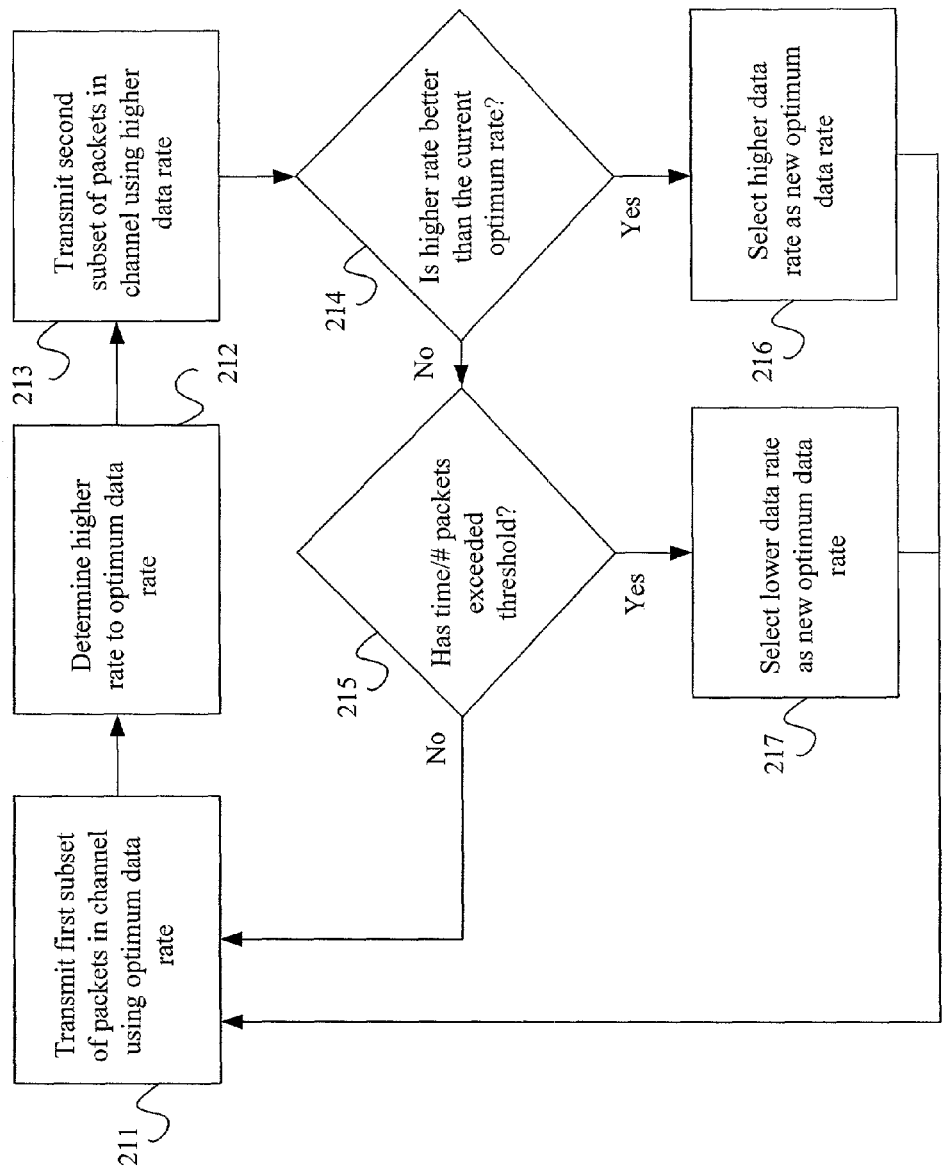
FIG. 2B illustrates a flow chart of an alternative transmission monitoring technique.

FIG. 2B illustrates a flow chart of an alternative transmission monitoring technique. In step 211 of this transmission monitoring technique, a first subset of the packets being sent in a channel can be sent using a selected optimum data rate. In step 212, a higher data rate to the optimum data rate can be determined. In one embodiment, an adjacent, higher data rates can be used. For example, if the originally selected data rate is 36 Mbps, then the adjacent data rate of 24 Mbps can be selected. Then, a second subset of the packets can be sent using the higher data rate in step 213. If the higher data rate is better than the current optimum rate, as determined in step 214, then the higher data rate can be selected as the new optimum data rate in step 216 and the process returns to step 211.

If higher data rate is not better than the current optimum rate, as determined in step 214, then the process determines whether a time or packet number value has exceeded a predetermined threshold in step 215. For example, a time of 5 seconds or 100 packets could be set as the threshold. If the threshold has been exceeded, then a lower data rate is selected as the new optimum data rate in step 217. In other words, the longer the data rate remains constant (under what are assumed to be dynamic channel conditions), the higher the probability that the data rate is not optimal. Therefore, this embodiment periodically reduces a "stale" data rate (assuming it has been constant for a predetermined time period or a predetermined number of packets have been sent at that rate) to a lower data rate. If the threshold has not been exceeded, then the current data rate is maintained and the process returns to step 211.

In one embodiment, the transmission monitoring of the first and second subset of packets is performed during a sampling window, wherein determining and selecting the optimum data rate is performed at the end of the sampling window. In one embodiment, the sampling window can refer to the amount of time over which the transmission monitoring is performed. In another embodiment, the sampling window can refer to the number of packets sent. In yet another embodiment, the sampling window can refer to a combination of the amount of time over which the transmission monitoring is performed and the number of packets sent.

In general, the sampling window should be long enough (and include sufficient packets) to ensure that a condition is accurately inferred, but short enough (and include the minimum packets necessary) to quickly respond to a condition change in the channel. In one embodiment, particularly for relatively stationary environments, a sampling window could be defined by having packet information on between 5 and 10 packets. In another embodiment, particularly for highly adaptive, mobile environments, a sampling window could be defined by having packet information on at least 3 packets, wherein a first packet is transmitted at a first data rate, a second packet is transmitted at a second data rate (lower than the first data rate), and a third packet is transmitted at a third data rate (higher than the first data rate). In accordance with one aspect of the invention, the optimal data rate can be automatically adjusted based on information collected during each sampling window.

To determine the optimal data rate (steps 204/214), the sender can analyze a feedback signal sent by the receiver after receiving each packet. For example, the IEEE 802.11 standard requires a receiver to provide an acknowledge signal to a sender after receipt of each unicast packet, thereby indicating that the sender can transmit the next packet. In the broadcast mode, the IEEE 802.11 standard requires no acknowledge signal. However, in one embodiment, a receiver can reflect a "ping" (i.e. debug) signal back to the sender. In this manner, the receipt of the reflected ping signal indicates that a sender has successfully made a physical connection to the receiver. The term "feedback signal" can refer to either the acknowledge signal or the ping signal.

Of importance, in either case, the receiver does not need any knowledge of the transmission monitoring being performed because it already provides such feedback signals in compliance with standard protocols. These feedback signals can be advantageously used to provide indirect, but valuable information regarding the channel. Transmission monitoring using these feedback signals eliminates the need for observing actual signal statistics, e.g. signal strength, at the receiver. In other words, the receiver need not be "intelligent". Thus, transmission monitoring can be effectively applied to many existing access points or clients in either the infrastructure mode or the ad hoc mode.

To facilitate the transmission monitoring of the invention, a number of tools, information classes, and primitives can be used. For example in a software implementation, the tools could include a rate control table like that shown in Table 1.

TABLE 1

| Rate | #Attempts (Small) | #Successes (Small) | Actual Sum of Sizes (Small) | #Attempts (Large) | #Successes (Large) | Actual Sum of Sizes (Large) |
|---|---|---|---|---|---|---|
| 6 | 11 | 11 | 990 | 22 | 20 | 33000 |
| 12 | 120 | 115 | 9780 | 235 | 220 | 352500 |
| 18 | 12 | 7 | 978 | 21 | 10 | 30200 |
| 24 | 0 | 0 | 0 | 0 | 0 | 0 |

Table 1 can include a list of available data rates (only four shown for illustration), number of data packets sent (i.e. # Attempts), and number of feedback signals received (i.e. # Successes). In accordance with one aspect of the invention, transmission monitoring can distinguish between short and long packets. The likelihood of error is a function of the data rate and the packet size. Specifically, the smaller the packet size, the quicker the message can be transmitted, thereby reducing the likelihood that signal degradation can occur. However, monitoring the transmission of many different sizes of packets would be more resource intensive and result in more limited statistics for each rate. Thus, the number of packet sizes as well as the sizes of those packets should be carefully considered. In one embodiment, two packet sizes can be provided, wherein a packet having a length of less than 500 bytes is considered a "short" packet and a packet having a length greater than or equal to 500 bytes is considered a "long" packet. (Note that the designation of short/long packets can be set by a system administrator or automatically set by tools of the transmitter.) In this manner, separate optimum data rates can be applied to short and long packets. Table 1 reflects these two packet sizes, although other rate control tables could include fewer or more packet sizes.

In one embodiment, at the beginning of each sampling window, the rate control table can be cleared and transmission information can be gathered. Note that data may not be present in one or more data rates. For example, the existing channel conditions in one sampling window might determine the optimum data rate to be 18 Mbps. Thus, if higher/lower data rates are used (see FIG. 2A), then transmission information would be gathered for 12 Mbps, 18 Mbps, and 24 Mbps, but not 6 Mbps.

At the end of the sampling window, the throughputs for the available data rates can be computed, wherein the throughput is a function of the data rate, the packet error rate, and the length of the packet. The packet error rate can be computed by using Equation 1.

$$\text{Packet Error Rate} = \frac{\text{\# Attempts} - \text{\# Successes}}{\text{\# Attempts}} \quad \text{Equation 1}$$

Note that as the # Attempts increase or the # Successes decrease, the packet error rate increases. For example, the more retries that are necessary to send a packet, the higher the # Attempts, thereby increasing the packet error rate.

In one embodiment, the actual length of the packets can be determined and summed (Actual Sum of Sizes in Table 1). Specifically, each packet has an associated overhead, e.g. a header (including an address) as well as a spacing between it and another packet. Because a shorter packet has a proportionately higher overhead compared to a longer packet, it would be desirable to minimize the number of retries particularly for shorter packets. By using the actual lengths, an average packet length can be computed (i.e. # Actual Sum of Sizes/# Attempts), thereby allowing a more accurate throughput to be computed.

Exemplary pseudo code to compute throughput is provided immediately hereafter for illustration purposes. Other embodiments of the invention can include different code to achieve different results.

```
double compute_throughput(data_error_rate, ack_error_rate, data_rate_mbps, ack_rate_mbps, length_bytes)
{
  cw_start=15;
  data_mac_overhead_bytes=24+4+2;
  ack_mac_overhead_bytes=14+2+6/8;
  slot_us=9;
  sifs_us=16;
  phy_overhead_us=20;
  symbol_time_us=4;
  packet_error_rate=1-((1-data_error_rate)*(1-ack_error_rate));
  difs_us=sifs_us+2*slot_us;
  if (difs_us>27)
    ack_timeout=difs_us;
  else
    ack_timeout=27;
  total_time=0;
  total_time_for_try=0;
  max_tries=20;
  prob_not_already_succeeded=1.0;
  cur_cw=cw_start;
  for (try_num=1; try_num<=max_tries; try_num++)
  {
    prob_this_try=prob_not_already_succeeded*(1-packet_error_rate);
    prob_not_already_succeeded*=packet_error_rate;
    half_cw_us=0.5*cur_cw*slot_us;
    raw_data_time_us=(data_mac_overhead_bytes+length_bytes)*8.0/data_rate_mbps;
    data_time_us=phy_overhead_us+ceil(raw_data_time_us/symbol_time_us)*symbol_time_us;
    raw_ack_time_us=(ack_mac_overhead_bytes*8.0/ack_rate_mbps);
    ack_us=phy_overhead_us+ceil(raw_ack_time_us/symbol_time_us)*symbol_time_us+sifs_us;
```

```
    this_try_us=difs_us+half_cw_us+data_time_us+
        ack_us;
    total_time_for_try=total_time_for_try+this_try_us;
    total_time+=total_time_for_try*prob_this_try;
    cur_cw=cur_cw*2+1;
    if (cur_cw>1023)
        cur_cw=1023;
}
if (prob_not_already_succeeded>0.5)
    throughput=0.0;
else
    throughput=(1-prob_not_already_succeeded)*length
        _bytes*8.0/total_time;
return throughput;
}
```

In accordance with the above code, as the data rate increases, the throughput increases. However, as the packet error rate increases, the throughput decreases.

In one embodiment, predetermined thresholds can be set to determine whether a data rate should be changed, thereby increasing the reliability of any changed data rate. Specifically, raising the data rate could significantly increase the risk of transmission error. Therefore, for example, the throughput of the higher rate should be a predetermined percentage above the throughput of the current optimum rate before the data rate is increased to the higher rate. This throughput plus threshold can be used in steps 204/214 (FIGS. 2A/2B) in determining whether another rate is better than the current optimum rate.

A predetermined threshold can also be used for lowering the data rate. For example, if the lower data rate throughput is higher than the current optimum data rate throughput plus threshold, then the optimum data rate is changed to the lower data rate. Otherwise, the optimum data rate is left unchanged. Note that the predetermined threshold for raising the data rate can be different from or the same as the predetermined threshold for lowering the data rate. Note further that in another embodiment, particularly in an aggressive environment, thresholds are not set and the data rate can be increased/decreased based solely on throughput.

In yet another embodiment, the predetermined thresholds can apply to the packet error rates, wherein the data rate can be raised if the packet error rate for the higher/lower data rate is at most a predetermined percentage higher than the packet error rate for the current optimum data rate. In one embodiment, this predetermined percentage could be 10%. The packet error rate plus threshold can be used in steps 204/214 (FIGS. 2A/2B) in determining whether another rate is better than the current optimum rate. Note that in another embodiment, thresholds are not set and the data rate can be increased based solely on packet error rate. Logically, in these two embodiments, the throughput need not be computed.

In one embodiment, the quality of service (QoS) associated with a communication stream can also be used in the selection of an optimum data rate. For example, referring back to FIG. 1C, each of communication streams 111, 112, and 113 can have a different QoS. In this case, communication stream 113 (which provides a telephony application) would probably have a higher QoS than either communication stream 111 (which provides a video application) or communication stream 112 (which provides a data application). Thus, because the need for robustness (to achieve a high QoS) is more important than high transmission speed, communication stream 113 would probably be sent at a slower data rate than either communication stream 111 or communication stream 112.

In one embodiment, the QoS could be factored in the transmission process by increasing the thresholds associated with steps 204/214. For example, instead of raising a data rate based on a maximum increase in packet error rate or throughput (in one embodiment, up to 10%), the data rate for a communication stream having a high QoS could be raised only if a maximum decrease in packet error rate or throughput could be achieved. In this manner, the QoS can advantageously balance the need for robustness with the desire for high transmission speed.

The various data rates need not be of the same modulation type. For instance, in the case of an 802.11g network, which can support both OFDM and DSSS/CCK packets, the OFDM and DSSS/CCK rates can be considered jointly. In this case, the list of possible rates could include the DSSS rates of 1, 2, 5.5, and 11 Mbps as well as the OFDM rates of 6, 9, 12, 18, 24, 36, 48, and 54 Mbps. The rates could be ordered by signal-to-noise required for a given packet error rate. The throughput for each of the rates could be computed, accounting for any additional overhead such as Request-to-send/Clear-to-send (RTS/CTS) signaling. The throughput for this calculation can assume a packet error rate of 0% or some other nominal rate such as 10%. At this point, any rate that delivers a throughput less than or equal to another rate that has greater signal-to-noise requirements (i.e. sensitivity) is removed from consideration. The remaining rates can be ordered by rate and used in the rate selection algorithm as described in reference to FIGS. 2A and 2B. For example, in Table 2 below, the ordered set of used rates would be: DSSS1, DSSS2, OFDM6, OFDM12, OFDM18, OFDM24, OFDM36, OFDM48, and OFDM54. Note that CCK5.5 is not listed because although its sensitivity is equal to that of OFDM12, its throughput is less (i.e. 4.7 Mbps compared to 15 Mbps). Similarly, CCK11 is not listed because although its sensitivity is equal to that of OFDM24, its throughput is less (i.e. 8.3 Mbps compared to 15.7 Mbps). Additionally, OFDM9 is not listed because its sensitivity is greater than that of OFDM12 (15.5 dB vs. 15 dB) but its throughput is lower (7.3 Mbps vs. 9.3 Mbps).

TABLE 2

| Modulation type | Rate | Throughput (Mbps) (at 10% PER for 1000-byte packet) | Sensitivity (dB) (for 10% PER for 1000-byte packet) |
|---|---|---|---|
| OFDM | 6 | 5.1 | 10 |
| OFDM | 9 | 7.3 | 15.5 |
| OFDM | 12 | 9.3 | 15 |
| OFDM | 18 | 12.7 | 17.5 |
| OFDM | 24 | 15.7 | 20 |
| OFDM | 36 | 20.1 | 22.5 |
| OFDM | 48 | 23.7 | 25 |
| OFDM | 54 | 24.9 | 27.5 |
| DSSS | 1 | 0.9 | 5 |
| DSSS | 2 | 1.8 | 8 |
| CCK | 5.5 | 4.7 | 15 |
| CCK | 11 | 8.3 | 20 |

Alternative Transmission Monitoring Techniques

In another embodiment of the transmission monitoring technique, the quality of and/or information regarding a data/acknowledge packet can also be analyzed to determine channel conditions. Specifically, the packets sent from the receiver to the transmitter will experience substantially the same channel conditions as the packets sent from the transmitter to the receiver. Thus, an analysis of these packets can be used to facilitate choosing the proper transmission rate.

Figure 3A:
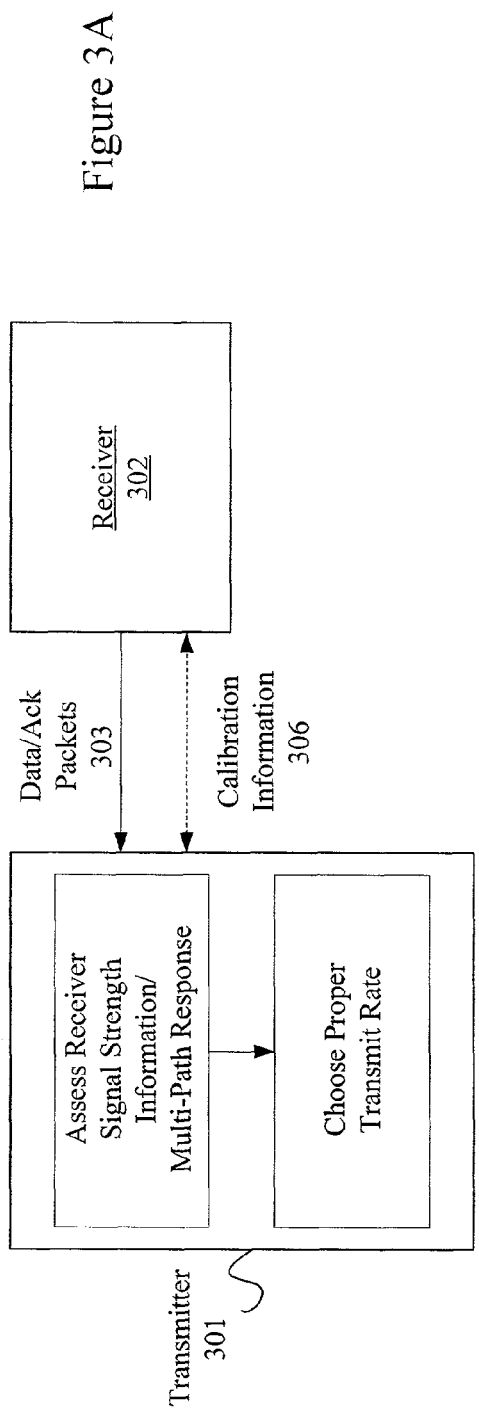
Figure 3B:
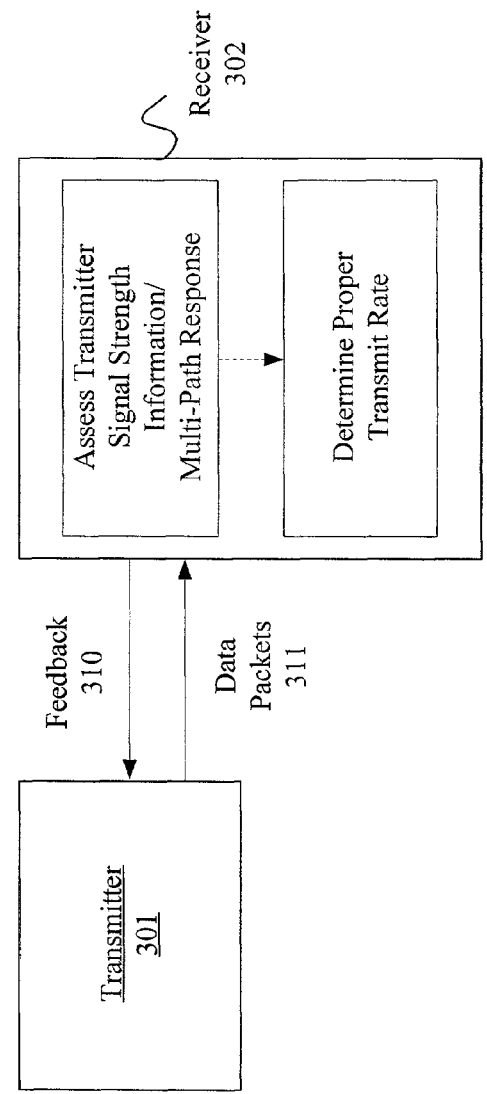

FIGS. 3A-3C illustrate exemplary alternative transmission monitoring techniques. For example, in FIG. 3A, a transmitter 301 can directly measure channel conditions to adjust its transmit data rate. Specifically, when transmitter 301 receives data or acknowledgement packets 303 from a receiver 302, transmitter 301 can assess receive signal strength information (RSSI) from packets 303. Transmitter 301 can use this information to estimate the degradation that packets it sends will experience. In this manner, transmitter 301 can accurately choose an appropriate transmit rate.

This method can be further improved by using optional calibration information 306, wherein transmitter 301 and receiver 302 can determine the differences between them in both transmit output power and receive sensitivity, thereby improving the accuracy of the assessed receiver signal strength as well as the proper transmit rate. For example, if transmitter 301 has an output power of 16 dBm and receiver 302 has an output power of only 14 dBm, then transmitter 301, when processing its received packet signal quality should understand that when it sends packets to receiver 302 (i.e. the packets will be received with a 2 dBm greater signal to noise ratio).

This calibration can occur at association time by the clients and access points exchanging capability information describing output powers and receive sensitivity in dedicated packets or part of existing packets for this purpose. Alternatively, the calibration can occur with the clients and access points transmitting data packets at their respective power levels, and appending additional packets regarding their receive signal to noise ratios. The clients and access points can both use the difference in received signal to noise ratios to determine how to infer the other node's SNR from their SNR.

Note that the multi-path response of the communications channel can also provide valuable information for predicting the optimal rate. Recall that in multi-path propagation, echoes of a single signal (e.g. caused by reflection) can result in the superposition of that signal. Thus, when multi-path propagation occurs, delayed copies of a given signal are received with the signal.

In the frequency domain, this results in some OFDM sub-carriers being more attenuated than others. By considering the multi-path channel and received signal strength appropriate decisions can be made. In one embodiment, the value of the lowest sub-carrier could be used to determine what data rate could be supported. For example, if the lowest sub-carrier has a 10 dB signal-to-noise ratio, then the 6 Mbps rate might be selected. However, if the lowest sub-carrier has a 30 dB signal-to-noise ratio, then the 54 Mbps rate could be chosen.

In another embodiment of the invention, the receiver can directly measure channel conditions and provide feedback to the transmitter. Specifically, and referring to FIG. 3B, receiver 302 assesses the quality of its input signal by looking at the multi-path channel information and an RSSI from transmitter 301. Receiver 302 can then determine the optimal rate for packet transmissions and communicate this rate to transmitter 301 through feedback 310. Feedback 310 could be, for example, a rate recommendation, set of rate recommendations for different lengths, or merely received signal strength and multi-path information. Feedback 310 could be sent through an out-of-band transmission, e.g. another packet specifically designed to transmit this information, or as part of a regular packet.

In another embodiment, receiver 302 can determine feedback 310 by measuring a Signal to Noise (SNR) ratio of data packets 311. The SNR analysis could include examining the median SNR of the frequency bins or some percentile and mapping that to a data rate. It could involve different mappings for different data rates, i.e. take channel information, map it using different functions to packet error rates for different rates and then use throughput calculation to compute throughputs and pick the best as before. In either case, one rate can be estimated and sent over, or one rate per one or more data lengths. The packet error rate estimation can entail estimating a bit error rate and raising this to the power of the length of the packet in bits to determine the packet error rate.

In accordance with another aspect of the invention shown in FIG. 3C, a method of determining the optimal rate for transmission to one client can be determined in part from the optimal rate of transmission to another client (called "group learning"). For example, by using the previously described methods, an access point 320 can determine an optimal transmit rate to communicate with a first client 321 (e.g. using received data/acknowledge packets 322 and, optionally, calibration information 323 to determine RSSI). Access point 320 can then map the RSSI to the optimal data rate.

This mapping can then be used to infer what the optimal data rate for other clients (e.g. client 324) with similar RSSI (which, in the case of client 324, could be determined by data/acknowledge packets 325) should be. In one embodiment, based on RSSI collected from multiple clients, the access point can map clients with similar RSSIs together, thereby facilitating a more accurate determination of an optimal rate for a client with limited statistics. For example, access point 320 could continually update a table common to all associated nodes. This table could map RSSI values to station information blocks (SIBS). In this manner, the statistics of a first set of clients experiencing similar path loss can be advantageously used to determine the proper rate for a second set of clients. This group learning methodology can be particularly useful in cases where statistics for the second set of clients are limited.

Transmission Monitoring Tools

The tools for transmission monitoring could include a look-up table (LUT). Specifically, instead of using Equations 1 and 2 to compute the throughput, the packet error rate and an average packet length can be used to access a pre-computed value in the LUT. In one embodiment, the LUT can be generated during system initialization, thereby significantly decreasing the time it takes to determine the transmission time of a given length packet at a given rate, i.e. the throughput.

Yet another tool for transmission monitoring could be a Station Identification Block (SIB) table, wherein the SIB table is a superset of the rate control table (see Table 1). For example, in addition to including the information provided in the rate control table, the SIB table could also include the status and various data structures for the station (e.g. in one embodiment of the invention, a data structure called TxRate-Ctrl_s can include the rate control information for the station, counters used for counting # Attempts and # Successes, the optimum data rate, the higher/lower data rates, and their corresponding transmission results and outcomes).

More specifically, the SIB table is an array of a data structure called SIB_ENTRY. Each SIB_ENTRY holds the operational status, identification, and capability of the station in the BSS. An exemplary SIB_ENTRY data structure in C is provided below. The station type can be: AP, STA or Ad-hoc. The station identifications are its MAC address as well as its association ID (if the station is associated). The various station statuses are: none, authenticated, associated, power-save, ad-hoc, up, or down. The operational statuses are: various statistics counters, state machine information, radio channel, data rate, privacy, and various pointers used for data transmission.

```
typedef struct    sibEntry {
    struct sibEntry         * pNext;            /* pointer to next in the list */
    struct sibTable         * pSibTab;          /* back ptr to enclosing sib table */
    A_SEM_TYPE              sibLock;            /* Lock for individual SIB */
    struct wlanDevInfo      *pDevInfo;
    WLAN_PRIV_RECORD *      pPriv;              /* WEP key record */
    CHLG_TEXT *             pChlg;              /* pointer to challenge text holding */
                                                /* place during authentication */
    QUEUE_DETAILS           txPSQueue;          /* queue to hold tx frames under power save mode */
    ATHEROS_DESC            *smePendDesc;       /* SME frames pending on tx completion */
    A_INT32                 numTxPending;       /* number of frames pending in TX queue */
    A_INT32                 numPSTxPending;     /* number of ps buffered frames pending in TX queue */
    WLAN_TIMESTAMP          lastBeaconTime;     /* timestamp of last beacon */
    A_UINT32                devNo;              /* device number, identifier */
    WLAN_MACADDR            macAddr;            /* MAC address of station */
    BSSID                   bssId;              /* BSSID of the network */
    A_UINT16                staIndex;           /* index into station table */
    A_UINT16                staState;           /* Current state of station */
    A_UINT32                transState;         /* Current state of transaction */
    A_INT16                 keyIndex;           /* key cache index in use (WEP | swretry) */
    CAP_INFO                capinfo;            /* Capability of station */
    A_UINT16                serviceType;        /* STA, AP, ad-hoc beacon, etc. */
    A_UINT16                assocId;            /* association ID */
    A_UINT16                listenInterval;     /* listen interval in units of beacon interval */
    A_UINT16                used;               /* flag to reflect the status of use */
    struct {
        A_UINT32            needClearDest;      /* flag meaning need to set the clearDestMask on next frame */
        A_INT32             numFilteredPending; /* #frames which will be filtered in queue */
        QUEUE_DETAILS       retryQueue;         /* buffered frames waiting for filtered frames to */
                                                /* be processed */
        A_INT32             qFrames;            /* number of frames in the retryQueue */
    } swRetry;
    A_UINT32                staLifeStartTime;   /* the time of the first frame from
                                                   the station (ms)*/
    A_UINT32                staLastActivityTime; /* the time of the last frame from */
                                                /* this station (ms) */
    A_UINT32                staLastActivityElapse; /* elapsed time from last activity (ms) */
    A_UINT32                authenAlgo;         /* authentication algorithm used by */
                                                /* this station */
    A_UINT32                psMode;             /* power saveing mode */
    A_INT32                 rssi;               /* current received signal strength indicator */
    WLAN_STATS              stats;              /* Structure of statistics counters */
    A_UINT32                lastRxSeqNo;        /* Last frame's sequence number */
    A_UINT32                lastRxFragNo;       /* Last frame's fragment number */
    A_UINT32                oneBeforeLastRxSeqNo; /* Memory of the sequence no. before last. */
    A_UINT16                Channel;            /* radio frequency */
    A_UINT16                seqNum;             /* sequence number */
    struct TxRateCtrl_s     txRateCtrl;         /* Tx Rate Control */
    RATE_SET                operationalRateSet; /* All supported operation rate by this station */
    RATE_SET                basicRateSet;       /* only supported basic operation rate by this station */
```

| | | -continued |
|---|---|---|
| RATE_SET | workingRateSet; | /* Working rates to be used for current tx*/ |
| A_UINT8 | defaultRateIndex; | /* index of default rate for the station */ |
| A_UINT8 | currentOperationalRateIndex; | /* index of current TX rate */ |
| A_UINT8 | basicRateIndex; | /* index of broadcast/multicast/beacon TX rate */ |
| A_UINT8 | sfRateIndex; | |
| A_UINT8 | lfRateIndex; | |
| A_UINT8 | lastRateIndex; | /* Rate used for the last packet */ |
| A_UINT8 | antTx; | /* Antenna used for transmission */ |
| A_UINT32 | rateAdaptationOff; | /* Rate adaptation off count */ |
| TAILQ_ENTRY(sibEntry) | lruField; | /* element of lruList */ |
| A_BOOL | privacyInvoked; | /* privacy enable status */ |
| A_UINT8 | dot1xState; | /* result of 1x auth */ |
| #ifdef VXWORKS | | |
| A_UINT16 | vlanTag; | /* vlan the sta belongs to */ |
| #endif | | |
| } SIB_ENTRY | | |

Primitives can facilitate performing various functions in a software implementation of the invention. For example, a primitive TxRateFind can return a data rate when a calling function wants to transmit a packet. In one embodiment, the data rate adaptation system can be disabled and enabled. For example, in one system, a user (e.g. a system administrator) can select a fixed rate for the data rate, thereby disabling data rate adaptation. In another system, if rate adaptation is disabled, then TxRateFind returns the channel configured by the user. Note that if data rate adaptation is disabled, then information is not provided to the rate control table (see Table 1). On the other hand, if rate adaptation is enabled, then primitive TxRateFind returns the optimum data rate for the channel. In one case, if the rate control table does not include information from a complete sampling window, TxRateFind returns a medium data rate (i.e. from the available data rates) for the optimum data rate, thereby minimizing the time to reach either a higher or lower data rate.

Another primitive RateCtrlTxRetryCntUpdate can be called by a transmit interrupt service routine to update the TxRateCtrl_s data structure with the result of the last data transmission. Specifically, after a packet is sent, either a feedback signal is received or a predetermined number of retries are performed (a programmable value that can be set by a system adminstrator), which results in one of a feedback signal or a time-out signal (e.g. to end a transmission using a blocked channel etc.). (Note that if a time-out signal is sent, upper layer software will typically reschedule another series of retries at a predetermined time in the future, but relieve the transmitter software of the responsibility of tracking this packet in the interim.) The transmit interrupt service routine can supply the primitive RateCtrlTxRetryCntUpdate with the station identification (ID), the data rate used in the transmission, the length of the packet (e.g short or long), and the number of transmit retries. RateCtrlTxRetryCntUpdate can use the packet length and the data rate to find the associated transmission time, which can be referenced in the above-described LUT. This transmission time can then be multiplied by the number of transmit retries, wherein the result is added to a total transmit time for the packet at that data rate.

Yet another primitive RateCtrlScheduler can be called at the end of each sampling window to determine the new optimum data rate. Specifically, the primitive RateCtrlScheduler can refer to the TxRateCtrl_s data structure to find transmissions at the current, optimum data rate (for short and long packets) and at the higher/lower data rates. The primitive RateCtrlScheduler can then calculate the throughput for each rate by dividing the total number of packets transmitted by the sum of all transmission times during the sampling window.

Background Scanning Technique

Each access point has a range of communication with its associated clients. For example, an access point may have a range of 300 feet for indoor communication and 1000 feet for outdoor communication. A plurality of communicating access points form a wireless local area network (LAN), wherein the larger the number of access points, the wider the range of the wireless LAN. Access point location, diversity, modulation scheme, and elevation can also significantly affect the range of the wireless LAN. As described in reference to FIG. 1A, a client can disassociate from an original access point (typically when the client will exceed the range of that access point) and re-associate to the network at another available access point. In one embodiment, if the data rate falls below a medium data rate (e.g. 24 Mbps), then a client can automatically begin to search for a better access point. In accordance with one aspect of the invention, to identify a better access point, the client can scan available access points associated with the wireless LAN. The identification of available access points and the association of the client to a new access point will be referenced herein as "roaming".

Figure 4A:
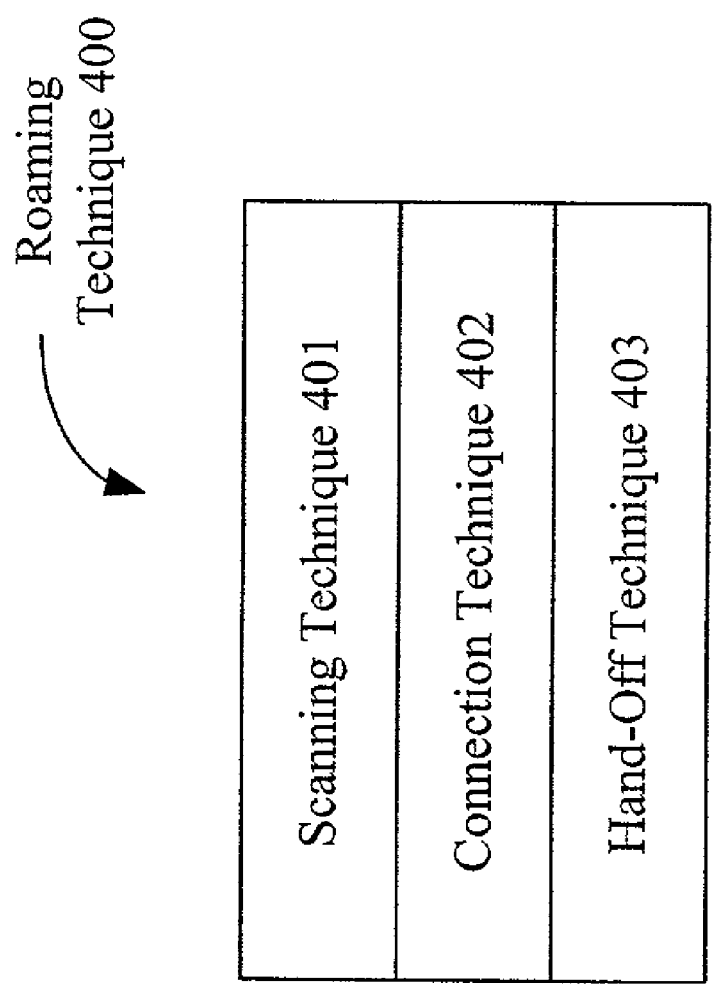
FIG. 4A illustrates a simplified roaming technique for a client that includes a scanning technique, a connection technique, and a hand-off technique.

FIG. 4A illustrates a simplified roaming technique 400 for a client that includes a scanning technique 401, a connection technique 402, and a hand-off technique 403. Of importance, roaming technique 400 can be implemented in combination with or separately from the above-described transmission monitoring technique.

One of the principal functions of scanning technique 401 is to collect beacons from any access point within range of the client. Beacons are broadcast signals sent by an access point in the infrastructure mode (or a group of stations in the ad hoc mode) regarding its identification and signal strength. These beacons serve to notify potential clients of the access point's presence (effectively indicating "I'm here") as well as to confirm its continued presence to associated clients. Thus, the beacon is also akin to a "heartbeat" that confirms that the access point is "alive" and within range. Finally, the beacon can indicate the timing of the signal, wherein stations that want to join the group can set their hardware to the same timing (i.e. a synchronization process) to properly receive the access point's signals. Typically, the timing is in the range from 20 milliseconds to 1000 milliseconds. Note that scanning technique 401 can be performed before or after connection technique 402. Pre- and post-connection scanning techniques are described in reference to FIGS. 4B and 4C, respectively.

Connection technique 402 forms the network associations and includes protocols for the client to associate, disassociate, and re-associate with the LAN. Connection technique 402 can be implemented by one or more drivers, i.e. programs that control devices, in the user's system. In the wireless LAN environment, the driver may conform to the network driver interface specification of the operating system, which defines a standard API (an application program interface that includes routines, protocols, and other tools for developing programs) for a network interface card (NIC) (for example, a wireless LAN card). In one embodiment, the driver can include a kernel interface layer that allows platform-independent "wrapper" functions (i.e. libraries of functions).

The wireless LAN driver primarily uses station management entity (SME) (i.e. a handshaking protocol) API function calls to perform the operations. Note that the SME coordinates interaction between a physical layer (i.e. the layer that interfaces with the channel and defines physical attributes for the channel, such as signal propagation and frequency) and a media access control (MAC) layer (i.e. the layer that provides the services required to control how a device on the network gains access to the transmitted data). Of importance, the wireless LAN driver also has access to the common data structures used by the core driver. An operating system timer based polling routine performs operations such as keeping track of station state (e.g. JOIN, AUTHENTICATE, ASSOCIATE, and ASSOCIATE BUT PERFORM BACKGROUND SCANNING), advancing to the next state by calling the next SME function, and timing out actions that were started earlier.

Hand-off technique 403 selects the best access point for the client and then moves the client's association to that access point. Hand-off technique 403 can include any known selection criteria for selecting the best access point.

When a client powers up or the network driver is loaded, the driver should look for and connect to a suitable access point using the scanning technique. FIG. 4B illustrates a flow chart of a pre-connection scanning technique to find such an access point. Specifically, the driver turns on beacon reception in step 411 and turns off all upper layer protocol transmits (i.e. the driver indicates to other parts of the system that the driver has limited resources for transmission and therefore cannot transmit any packets) in step 412. The driver then identifies a channel (which is typically provided in a channel listing) in step 413.

For that channel, the driver sets the radio to the desired channel frequency and the desired modulation scheme in step 414. Note that a modulation scheme can refer to one of the 802.11a or 802.11b standards as well as one of a normal mode and a turbo mode (wherein the normal mode refers to a 20 MHz bandwidth and turbo mode refers to a 40 MHz bandwidth). Thus, one of four modulation schemes can be selected in one embodiment of the invention (e.g. OFDM and OFDM Turbo for the 802.11a standard, as well as CCK and CCK Turbo for the 802.11b standard). Note that other embodiments could refer to developing or new standards (e.g. 802.11g) as well as other modes. In one embodiment, modulation scheme selection can be transparent to the system hardware, thereby allowing quick switching between modulation schemes and thus facilitating optimal system performance.

At this point, the driver can send a broadcast probe request (i.e. a broadcast signal to any access points within range asking, in effect, "Does any access point hear me?") in step 415. In step 416, the driver can collect any probe response frames (i.e. the responses to the broadcast probe request from one or more access points) and beacons. Note that an access point on the selected channel may have sent a beacon, but not a probe response frame (or vice versa) (wherein in typical embodiments both the beacon and probe response include substantially the same information). Moreover, it would be desirable for the driver to be aware of any access points on the selected channel. Therefore, in one embodiment of the invention, the driver can collect both probe response frames as well as beacons. After filtering out duplicate probe response frames and beacons, the driver adds the frames and beacons to the scan list in step 417.

Note that in this embodiment, the driver is in an "active" scanning mode, wherein the client can send broadcast probe requests and receive corresponding probe response frames. In another embodiment, the driver can be in a "passive" scanning mode, wherein the client cannot send broadcast probe requests. In the passive scanning mode, step 415 can be eliminated and steps 416/417 can be modified to collect/add only beacons.

A scan time limit can then be analyzed in step 418. For example, a minimum scan time (e.g. 50 ms) or a maximum scan time (e.g. 200 ms) can be used. If a scan time limit is not met as determined in step 418, the driver can wait for a predetermined period of time in step 419 and then return to step 416 to collect additional probe response frames and/or beacons. On the other hand, if a scan time limit is met, and another channel is within range as determined in step 420, then the driver returns to step 413 to identify that channel. When all channels have been identified and analyzed, the driver can search its scan list for any AP or IBSS (an independent basic service set (i.e. a client in the ad hoc mode) in step 421.

If an AP or IBSS is not found, as determined in step 422, then the scan time limit can be modified in step 423 to provide a longer scan time period. In one embodiment, a system administrator can select the new scan time limit for the next scan cycle by balancing the need for a desired (i.e. short) response time and the reliability of finding a channel. After modifying the scan time limit, the process returns to step 411 for another scan cycle. If an AP or IBSS is found in step 422, then the process can proceed to hand-off technique 403, which determines the best access point of the available access points in the scan list.

To identify suitable access points for that client, the driver can perform a selection process based on a desired service set identifier (SSID) (i.e. an identifier attached to a packet that functions as a password to be accepted in the network (choice of any or specific)). Generally, only access points using the same SSID can form an associated network. The driver can also analyze the receive signal strength (typically in the range of 10-65 dB of the beacon to determine whether a suitable access point is better than the client's current access point. Finally, the driver can also analyze the supported data rate(s) and modulation scheme of any access point to determine the best access point for the client. The hand-off algorithm can determine the ranking of all identified, suitable access points based on these criteria.

To connect a client to an access point using connection technique 402, a sequence of JOIN, AUTHENTICATE, and ASSOCIATE primitives can be executed using connection technique 402 (e.g. the SME API). Specifically, the JOIN primitive is used when the client determines the most suitable access point, the AUTHENTICATE primitive is used when the client confirms its request to associate with the most suitable access point, and the ASSOCIATE primitive is used when the client is ready to actually associate with the access point.

Because these are asynchronous operations, connection technique 402 can use a state machine driven by polling. Specifically, a flag word can include a plurality of bits set for desired operations. A callback routine of each primitive can clear the bit for the completed operation, thereby starting the next operation. The polling task can time out and cancel an operation that fails to complete in a predetermined amount of time. In one embodiment, an operation can be retried until successful or a maximum number of attempts have been made.

To track a connection, the client can use two traffic indicators—beacons and frames. The driver keeps statistics of all the received beacons and frames. The client hardware is capable of generating interrupts if it misses a specified number of beacons in a row. If the client determines that it has lost connection to the access point, then the client can re-start scanning technique 401. If a maximum number of attempts to find an access point has been exceeded (i.e. a predetermined number of cycles including steps 411-423 have been completed without finding an AP or IBSS), the client can conclude that there is indeed no access point within range and put the device in a power save mode. After a predetermined period of time (typically on the order of minutes), scanning technique 401 can be restarted.

Because a client, such as a laptop computer or a personal digital assistant (PDA), is frequently powered by a battery to facilitate mobility, it is highly desirable for the client to operate in the most energy efficient manner possible. Therefore, in accordance with one aspect of the invention, the client can take advantage of its power save mode features to momentarily suspend communication with the current access point and use short time slots to search for other access points. Advantageously, this post-connection (also called background) scanning technique ensures that another access point can be located without disturbing the current access point connection.

Figure 4C:
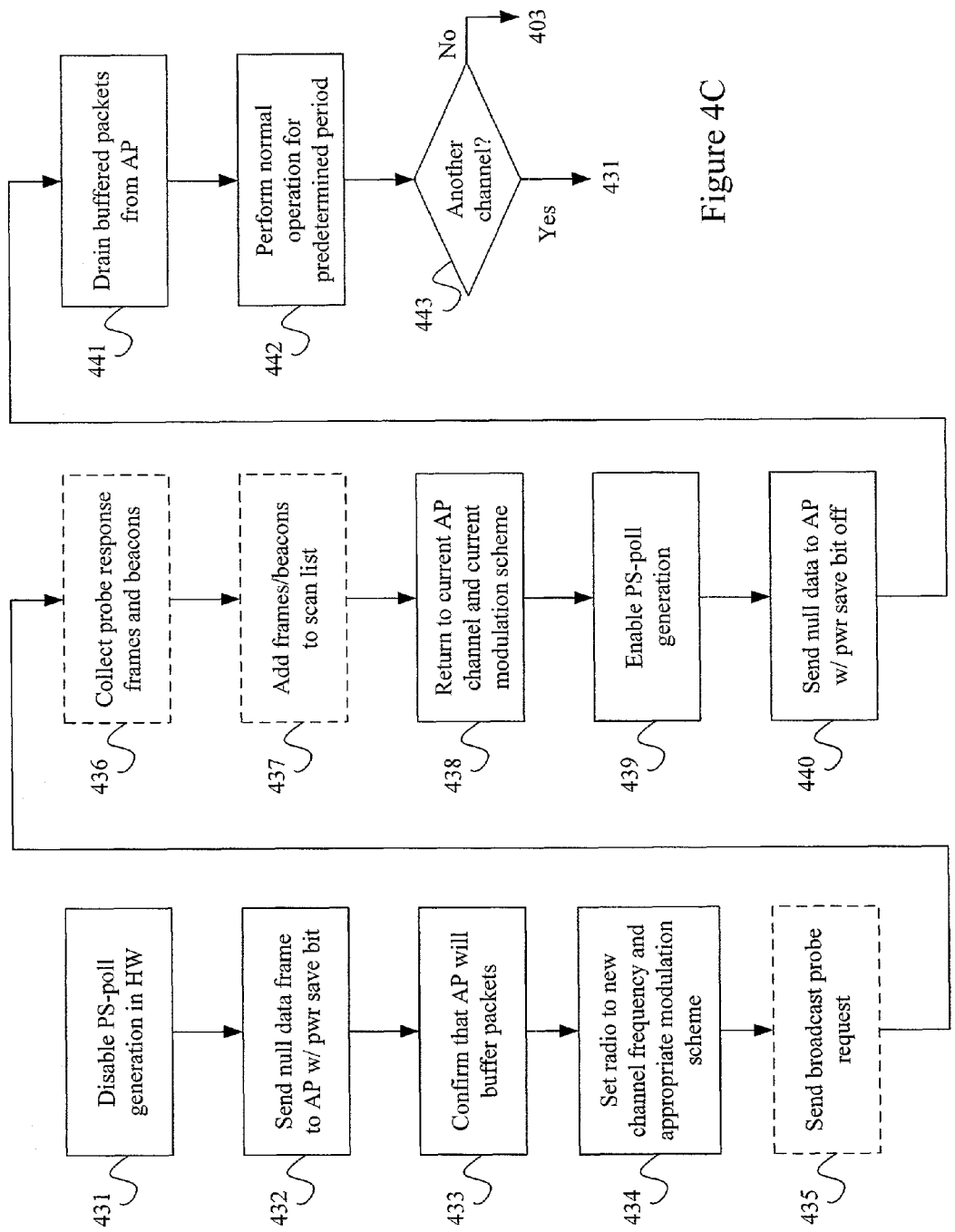
FIG. 4C illustrates a flow chart of a background scanning technique for a client to identify available access points.

In a background scanning technique shown in FIG. 4C, the client can use the following steps to identify available access points. Specifically, in step 431, the driver can disable power save poll generation, thereby ensuring that the client hardware remains "awake" (note that the client is normally allowed to "sleep" when not active). In step 432, the client can send a null data frame to the access point with a power save bit turned on, wherein the power save bit indicates to the access point that the client is "asleep" and therefore cannot receive packets. In step 433, the client can wait for confirmation that the access point will buffer (i.e. retain and queue) the packets destined for that client. After confirmation, the client can safely proceed to perform a background scan while the access point believes the client is asleep.

To perform the background scan, the client can set the radio to another channel frequency and/or a new modulation scheme in step 434 and send a broadcast probe request in step 435. In step 436, the client can collect the resulting beacons and probe response frames. After filtering out duplicates, the client can add the collected beacons and frames to the scan list in step 437.

Note that in this embodiment, the driver is in the "active" scanning mode, wherein the client can send broadcast probe requests and receive corresponding probe response frames. In another embodiment, the driver can be in a "passive" scanning mode, wherein the client cannot send broadcast probe requests. In the passive scanning mode, step 435 can be eliminated and steps 436/437 can be modified to collect/add only beacons.

In step 438, the client can return to the current access point's channel and modulation scheme. Note that this step can occur immediately after a beacon or frame is received or after a predetermined scan time if no frames were received.

In step 439, the client can enable the power save poll generation in its hardware. In step 440, the client can send a null data frame to its current access point with the power save bit turned off, thereby triggering the access point to transfer any buffered packets destined for the client to be transferred to the client in step 441. At this point, the client can perform its normal operation for a predetermined period of time in step 442. In one embodiment, this predetermined period of time can be in the range of 300 ms to 1 s. Note that other periods of time can be used; however, such periods of time should ensure proper adherence to upper layer protocols.

Further note that the time for performing steps 431-441 should be relatively short compared to the time for performing step 442, thereby ensuring that the access point does not drop any packets. Specifically, the access point can be buffering the packets destined for multiple clients, wherein the access point has limited resources for such buffering. Although the access point can notify a client regarding the initial availability of buffering resources (step 433), the continued availability of such buffering resources for one client can significantly change, without warning, based on the needs of the clients joined to the access point.

In a standard power save mode, the access point provides a unique bit in its beacon to notify a "sleeping" client that packets are available for that client. This bit wakes up the client, thereby triggering the driver to notify the access point to send the packets. Of importance, if the buffering resources of the access point are expended, then the access point must begin to drop some buffered packets. Thus, the client that fails to respond to the access point in a timely manner can jeopardize its packets.

In accordance with one feature of the invention, because the driver is performing the background scanning technique, the driver may not be able to respond to the access point. Therefore, to minimize the possibility of the access point dropping packets, the time for performing steps 431-441 should be relatively short compared to the time for performing step 442. In one embodiment, the time for performing steps 431-441 can be between 100-300 ms.

If additional channels are available, as determined in step 443, then the client can return to step 431. Otherwise, the station can proceed to hand-off technique 403 (FIG. 4A) to determine whether another access point is better than the current access point. In accordance with one embodiment, the client can use this background scanning technique to build a list of 802.11 compliant stations that can operate as a fully connected wireless network, i.e. a basic service set (BSS).

Figure 4D:
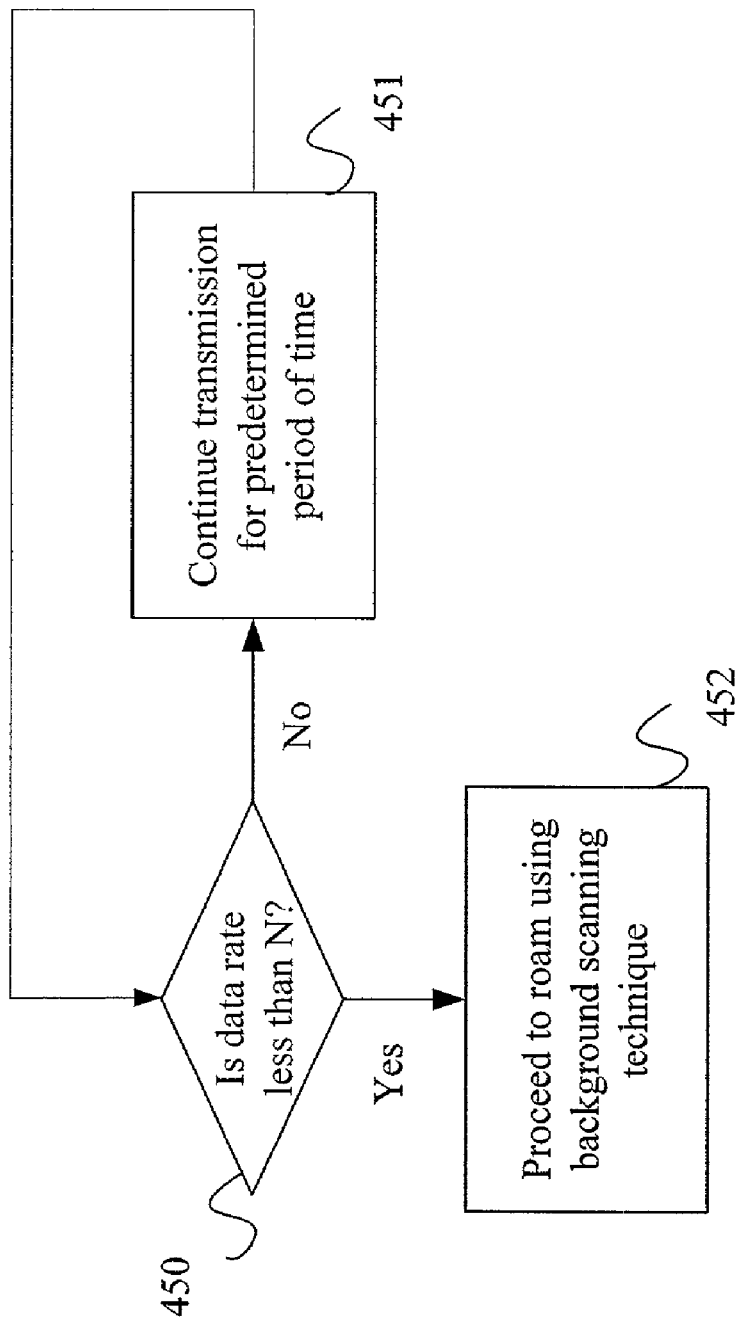
FIG. 4D illustrates a simplified flow chart, wherein if the current data rate is less than a predetermined data rate, then the client can begin to roam using the background scanning technique. On the other hand, if the current data rate is equal to or greater than the predetermined data rate, then the client can continue its transmission for a predetermined period of time.

In one embodiment, the background scanning technique can be used continuously during a transmission. In another embodiment shown in FIG. 4D, if the current data rate is less than a predetermined data rate N, as determined in step 450, then the client can begin to roam using the background scanning technique in step 452. On the other hand, if the current data rate is equal to or greater than the predetermined data rate N, then the client continues its transmission in step 451 for a predetermined period of time until returning to step 450. In the embodiment shown in FIG. 4D, the predetermined data rate N determines whether another data rate in the channel should be used (as provided by the transmission monitoring technique) or the client considers joining another access point (as identified by the background scanning technique).

Note that the background scanning technique can be used with most connection and hand-off techniques. In one embodiment, to make the access point hand-off transition invisible to the upper layer protocols, the client does not notify the operating system about its disassociation with the current access point and its new association with another access point. Thus, in the view of the upper layer protocols, the client stays connected to the same network (wherein the network could include multiple access points, each access point having a unique address), thereby minimizing the possibility of dropped packets.

The state of the station, access point connection, and traffic indicators (e.g. beacons and frames) are available through the shared station data structures (e.g. station information base (SIB) information, fields used to maintain counters and device-related statistical data, as well as other files that work in the driver space). An operating system timer based task, programmed to trigger periodically, can check all the connection operations in progress. In one embodiment, the timer can be triggered every 100 ms. This timer can count down timeout values, start or terminate operations, and update the state of the station. In one embodiment, the timeout values are tunable and can be adjusted for desired response time and performance.

Figure 1B:
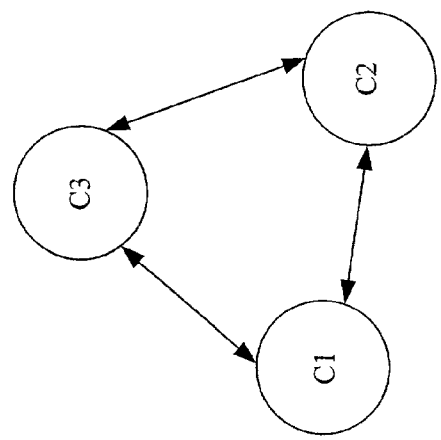
FIG. 1B illustrates an ad hoc (also called a peer-to-peer) mode, wherein peers can communicate directly without an access point.
Figure 1C:
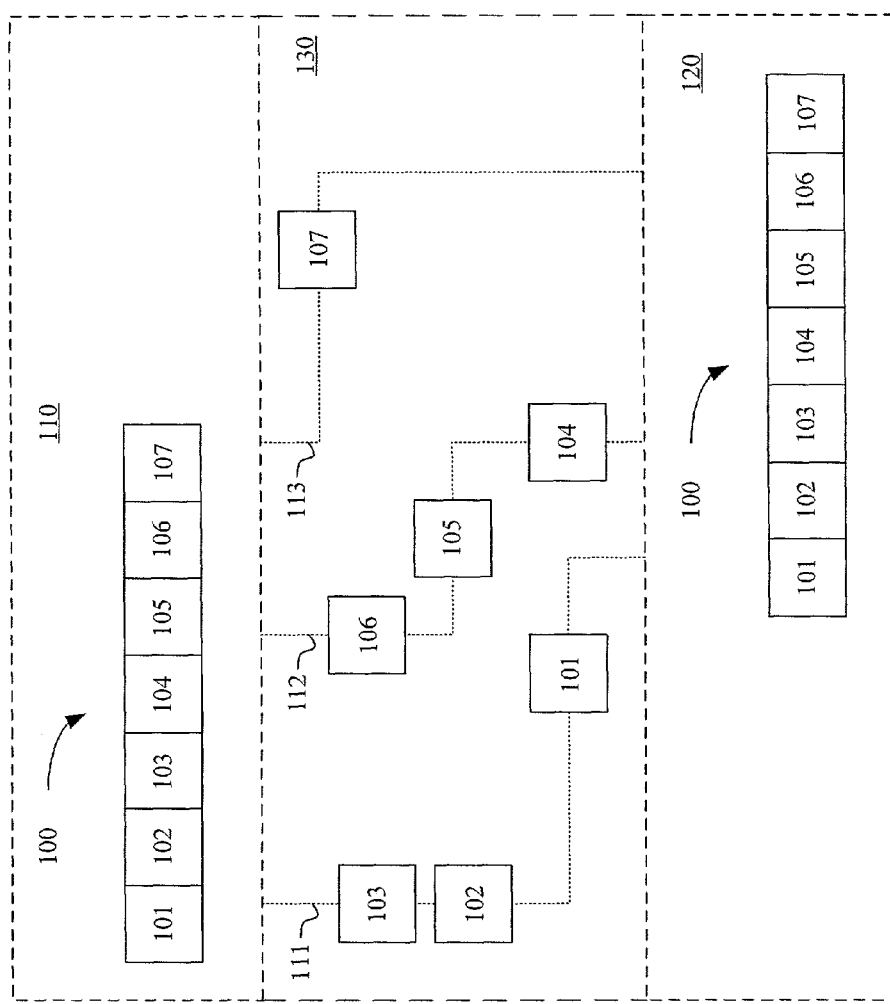
FIG. 1C illustrates a sender transmitting multiple streams of communication over a channel to a receiver.

Although the background scanning technique has been described in reference to the infrastructure mode, this technique can also be used in the ad hoc mode (see FIG. 1B). For example, in the ad hoc mode, instead of sending a null data frame to the AP with the power save bit (step 432), the client could send the null data frame and the power save bit to all clients in the group.

Other Embodiments

Note that the above-described transmission monitoring and background scanning techniques can be used in unicast (one sender/one receiver) transmissions as well as broadcast (one sender/multiple receivers) transmissions and multicast (one sender/multiple designated receivers) transmissions. In this case, the acknowledgment packets, which are present for unicast messaging, would not be present. Thus, other feedback mechanisms could be used.

Irrespective of transmission type, if there are obstacles or interference sources in the communication channel, the transmission monitoring technique can automatically adjust the data rate to provide maximum data throughput while ensuring reliable data transmission. Moreover, once again irrespective of transmission type, the background scanning technique can ensure that available access points can be efficiently identified.

It will be understood that the disclosed embodiments regarding transmission monitoring and energy efficient scanning are exemplary and not limiting. For example, in another transmission monitoring technique embodiment, a software retry function can be implemented. To simplify hardware design, the hardware can be designed to send a packet only at one given rate at a time. Thus, to change the rate of an outgoing packet, software needs to perform the retry. Specifically, the sender will continue to send a packet until a feedback signal is received or a time-out is determined. This function is essentially performed by hardware, i.e. the transmitter. If a time-out is determined, then software (which controls the transmission monitoring technique) can attempt to resolve the problem transmission. In one embodiment, the software can dramatically reduce the data rate, thereby increasing the probability that the receiver can read the packet and return a feedback signal to the sender. For example, if the current optimal data rate is 24 Mbps, then the software retry function could reduce the data rate to 6 Mbps to ensure communication is established.

In background scanning technique embodiments, the driver can be serialized (i.e. wherein the driver is responsible for queueing and buffering of the packets from its upper layer protocols) or de-serialized (i.e. wherein a separate queue can be used to queue and buffer packets from the upper layer protocols). Note that once the PS-poll generation is enabled (step 429), both the receive queue (which can receive buffered packets from the access point) as well as the transmit queue(s) (which are provided in the client) can operate simultaneously.

In yet another embodiment, the transmission monitoring can be combined with the background scanning technique to ensure that the client can obtain the best data rate, whether using 802.11a, 802.11b, 802.11g etc. In other words, once available access points are identified using the background scanning technique, the hand-off technique can include determining the best data rate using the transmission monitoring technique.

Accordingly, it is intended that the scope of the invention be defined by the following Claims and their equivalents.

The invention claimed is:

1. A method of optimizing transmission of a plurality of data packets in a channel, which forms part of a wireless communication system, the method comprising:
sending a first subset of the plurality of data packets in the channel using a first data rate, wherein the first data rate is a current optimum data rate;
sending a second subset of the plurality of data packets in the channel using a second data rate, wherein the second data rate is higher than the first data rate;
analyzing feedback signals associated with the first subset and the second subset; and
selecting one of the first data rate and the second data rate based on the analyzing,
wherein selecting the second data rate changes the current optimum data rate to the second data rate, and
wherein selecting the first data rate includes determining whether the first data rate is stale, wherein if the first data rate is stale, then changing the current optimum data rate to a third data rate, wherein the third data rate is lower than the first data rate, and wherein if the first data rate is not stale, then maintaining the first data rate as the current optimum data rate.

2. The method of claim 1, wherein selecting includes analyzing a packet error rate for the first subset and the second subset.

3. The method of claim 2, wherein selecting further includes applying a threshold to the packet error rate of the second subset.

4. The method of claim 3, wherein the threshold is adjusted based on desired quality of service for the transmission.

5. The method of claim 1, wherein selecting includes analyzing a throughput for the first subset and the second subset.

6. The method of claim 5, wherein selecting further includes applying a threshold to the throughput of the second subset.

7. The method of claim 5, wherein the threshold is adjusted based on quality of service for the transmission.

8. The method of claim 1, wherein the second data rate is an adjacent data rate to the first data rate.

9. The method of claim 1, wherein determining includes measuring one of the time of transmission at the first data rate and a number of packets sent using the first data rate.

10. The method of claim 1, wherein the first and second data rates include different modulation types.

11. The method of claim 10, wherein the modulation types include at least two of OFDM, DSSS, and CCK.

12. The method of claim 1, further including ordering the rates by a sensitivity for a given packet error rate.

13. The method of claim 12, further including computing a throughput for each rate, wherein a rate that delivers a throughput less than or equal to the other rate that has greater sensitivity is removed from consideration.

14. The method of claim 13, further including calibrating differences between a transmitter and a receiver in at least one of transmit output power and receive sensitivity.

* * * * *